United States Patent [19]

Bukac et al.

[11] 3,945,984

[45] Mar. 23, 1976

[54] PREPARING POLYAMIDES BY ANIONIC POLYMERIZATION OF LACTAMS

[75] Inventors: Zbynek Bukac; Jan Sebenda, both of Prague, Czechoslovakia

[73] Assignee: Cceskoslovenska akademie ved, Prague, Czechoslovakia

[22] Filed: Mar. 26, 1974

[21] Appl. No.: 454,906

Related U.S. Application Data

[62] Division of Ser. No. 275,155, July 26, 1972, Pat. No. 3,843,608.

[30] Foreign Application Priority Data

July 27, 1971 Czechoslovakia .................. 5478-71
July 27, 1971 Czechoslovakia .................. 5481-71

[52] U.S. Cl. .......... 260/78 L; 260/78 P; 260/243 R; 260/281 R

[51] Int. Cl.² .................. C08G 69/24; C08G 69/20
[58] Field of Search .......................... 260/78 L, 78 P

[56] References Cited
UNITED STATES PATENTS

| | | | |
|---|---|---|---|
| 3,216,977 | 11/1965 | Brouns | 260/78 L |
| 3,519,624 | 7/1970 | Huber-Emden | 260/78 L X |
| 3,671,500 | 6/1972 | Johnson | 260/78 L |

*Primary Examiner*—Lucille M. Phynes

[57] ABSTRACT

A method of preparing polyamides by anionic polymerization of cyclic lactams which comprises polymerizing at least one such lactam in the presence of at least one co-catalyst selected from the group consisting of N-substituted 1,3-oxazines, 1,3-thiazines, trioxopipendines and thioxopiperidines.

5 Claims, No Drawings

PREPARING POLYAMIDES BY ANIONIC POLYMERIZATION OF LACTAMS

CROSS-REFERENCE to RELATED APPLICATION

This is a divisional application of Ser. No. 275,155, filed July 26, 1972, now U.S. Pat. No. 3,843,608, granted Oct. 22, 1974.

The invention relates to a method of preparing polyamides by anionic polymerization and copolymerization of lactams with from 3 to 12 carbon atoms in their rings. The present invention is related to copending U.S. application Ser. No. 275,156, now abandoned filed on even date herewith, based upon Czechoslovak Application Nos. PV 5479 and PV 5480, filed July 27, 1971 to which reference can be made. In the present application there is utilized as co-catalysts, six-membered heterocyclic compounds selected from the group consisting of N-substituted 1,3-oxazines, 1,3-thiazines, trioxopiperidines and thiodioxopiperidines of the general formulae

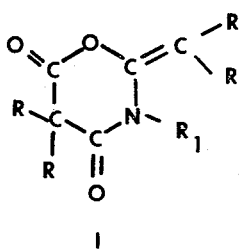

I

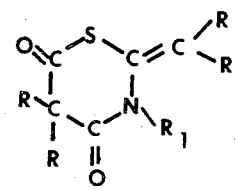

II

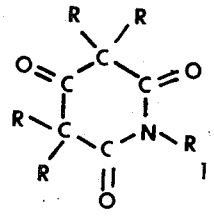

III

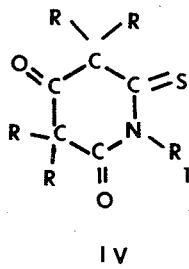

IV

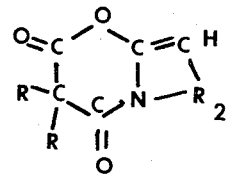

V wherein

R is an alkyl or alkenyl with from one to 18 carbon atoms, or an aralkyl derived from a lower alkyl, $R_1$ is either R or an aryl, or a dialkylaminoaryl or an alkoxyaryl, the alkyls being lower alkyls, $R_2$ is an alkenyl with from 2 to 10 carbon atoms.

Anionic polymerization of lactams as e.g. epsilon-caprolactam, is catalyzed by strong bases such as alkali metal salts of the lactam. The rate of polymerization is, however, sufficiently high only at comparatively high temperatures of about 250°C, thus above the melting point of the polyamide. The rate of polymerization can be substantially increased by adding co-catalysts with acylating or carbamoylating activity such as diacylamines, 3-ketoacylamides or isocyanates, so that the polymerization can be carried out without melting the polyamide. In this way, large castings may be manufactured by direct polymerization in the mold, bubbles and cavitites caused by solidification of the melt being avoided. Said co-catalysts possess, however, also some shortcomings. The co-catalysts containing imide groups are sensitive to bases, undergoing side-reactions by which the co-catalyst is consumed. The polymer-monomer equilibrium may be therefore reached only within a narrow range of reaction conditions. This shortcoming may be partly removed by using more-than-bicomponent catalytic systems, e.g. according to the Czechoslovak Pat. Specification No. 138,160, such systems are, however, more complex than bi-component ones. Activators of the type of amides of 3-oxocarboxylic acids (see U.S. Pat. No. 3,600,360) have longer life, their co-catalytic activity is, however, very high so that the rate of polymerization is considerable e.g. at 150°C, similarly as in the case of isocyanates. Thereby the time for filling the molds is restricted and the maintaining of adiabatic course of polymerization in large castings is difficult, especially with rapidly polymerizing lactams such as caprylolactam or laurolactam. Polyisocyanates, often used for manufacturing tough castings, have a serious disadvantage in their cancerogenity.

The present invention defined above removes said shortcomings. The polymerization with co-catalysts of the invention is slower at comparatively low temperatures (about 150° to 180°C) than with imides, isocyanates or 3-oxamides (see U.S. Pat. No. 3,600,360). Thereby the pot-life, i.e. the time between the initiation of the monomer and filling the mold, is extended and the manufacture of high quality castings is made easier. Another advantage is that polyisocyanates, used hitherto for obtaining high degree of polymerization and toughness, may be replaced by innocuous substances. The process of the invention is, however, not limited to preparing polyamides with very high molecular weight. The degree of polymerization and thus the viscosity of the melt may be controlled in known manner, using carboxamides or sulfonamides. Therefore, the process of the invention is applicable also for other purposes than making large castings, e.g. also for continuous extrusion according to U.S. Pat. No. 3,200,045 corres. Czech. 97,332. As the co-catalysts of the invention possess a considerable life in the polymerizing system, they may be used also for the two-step polymerization where the polymerizate is shaped at lower conversion and the polymerization is then finished in the shaped article (see e.g. Czechoslovak Pat. Specification No. 113,971 corresponding to the U.S. application Ser. No. 365,507).

Co-catalysts of this invention are suitable for most method of manufacturing polyamides by anionic polymerization of lactams. This versatility is important in industrial practice.

The co-catalysts defined above may be easily prepared e.g. by reacting dichlorides of malonic acid with amides and thioamids (see the U.S. Pat. No. 3,373,159 and the paper of Martin, James C. et al: J.Org. Chem. 31, 2966 /1966/, or also Ziegler E. et al: Monatsh. Chem, 95, 1318 /1964/, and ibidem, 96, 1347 /1965/), or also by reacting acylisocyanates with ketenes (U.S. Pat. No. 3,394,132). Other co-catalysts mentioned below have been prepared analogically.

The method of the invention is illustrated by following non-limitative Examples. All parts and percentages are meant by weight if not stated otherwise.

EXAMPLE 1

0.319 mol % of dihydro-2-isopropylidene-3,5,5-trimethyl-4H-1,3-oxazine-4,6 (5H)-dione were dissolved at 90°C in molten caprolactam containing 0.314 mol % of its sodium salt. The solution was kept at 152°C under inert gas. It solidified within 17 minutes. The polymerizate contained 95.5 % of polycapronamide, average degree of polymerization about 900.

When using 0.262 mol % of the same co-catalyst and 0.353 mol % of the sodium salt of caprolactam and increasing the temperature to 175°C, the melt solidified within about 4 minutes and contained after 30 minutes 96.5 % of polycaprolactam, intrinsic viscosity in cresol $[\eta] = 5.07$.

EXAMPLE 2

Polymerization mixture, prepared by gradual dissolving 0.321 mol % of sodium hydride and 0.317 mol % of dihydro-2-isopropylidene-3-ethyl-5,5-dimethyl-4H-1,3-oxazine-4,6 /5H/-dione in caprolactam was heated 5 minutes to 210°C and then after polymerized at 175°C for 25 minutes. The polymerizate contained 95.4 % of polyamide with average degree of polymerization 850. When using acetylcaprolactam as co-catalyst, the conversion attained, at the same conditions, only 89–90 %.

EXAMPLE 3

Polymerization of caprolactam was carried out with 0.305 mol % of sodium salt of caprolactam and 0.9 mol % of the co-catalyst of the Example 1. The polymerization temperature was 210°C, time 30 minutes. The yield of the polyamide amounted to 91 %, intrinsic viscosity to 2.14, corresponding to an average degree of polymerization 282.

EXAMPLE 4

The polymerization of caprolactam was carried out like in Example 1, at 175°C, except that 0.5 mol % of N-ethyl benzamide was added as modifier of molecular weight. At the conversion of 96 % the average degree of polymerization was only 400, in comparison with 900 reached without modifier.

EXAMPLE 5

The polymerization batch contained 80 % of caprolactam and 20 % of gamma-methyl caprolactam, 0.3 mol % of sodium salt of caprolactam and 0.3 mol % of dihydro-2-isopropylidene-3-octadecyl-5,5-dimethyl-4H-1,3-oxazine-4,6-/5H/-dione. It was heated for 60 minutes to 175°C. The polymerizate thus obtained contained equilibrium amount of copolyamide and monomers. Similar results were obtained if gamma-methyl caprolactam was replaced by caprylolactam or laurolactam.

EXAMPLE 6 – 12

Polymerizates with equilibrium or almost equilibrium amounts of the polyamide were prepared by polymerizing caprolactam at 155°C and 175°C for 60 minutes in presence of 0.3 mol % of sodium salt of caprolactam and 0.3 mol % of a co-catalyst of the general formula

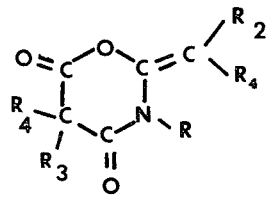

wherein the substituents had the meaning stated in the following Table:

| Example | R | $R_1$ | $R_2$ | $R_3$ | $R_4$ | $[\eta]$ |
|---|---|---|---|---|---|---|
| 6 | $C_6H_5$ | $CH_3$ | $CH_3$ | $CH_3$ | $CH_3$ | 6.25 |
| 7 | $CH_3$ | $CH_3$ | $C_2H_5$ | $CH_3$ | $CH_3$ | 5.93 |
| 8 | $C_6H_{11}$ | $CH_3$ | $CH_3$ | $CH_3$ | $CH_3$ | 6.31 |
| 9 | $C_2H_5$ | $CH_3$ | $CH_3$ | $C_6H_5CH_2$ | $C_6H_5CH_2$ | 6.20 |
| 10 | p-$CH_3O.C_6H_4$ | $CH_3$ | $CH_3$ | $C_2H_5$ | $C_{18}H_{37}$ | 6.38 |
| 11 | $(CH_3)_2N.C_6H_4$ | $CH_3$ | $CH_3$ | $CH_3$ | $CH_3$ | 5.67 |
| 12 | $C_{18}H_{37}$ | $CH_3$ | $C_3H_7$ | $CH_3$ | $CH_3$ | 6.01 |

EXAMPLE 13

0.3 mol % of sodium salt of caprolactam was dissolved at 100°C in molten caprolactam, whereafter 0.2 mol % of 1-ethyl-3,3,5,5-tetramethyl-2,4,6-piperidinetrione was added and the solution kept at 175°C for 30 minutes. The melt solidified after about 5 minutes. After 30 minutes the polymerizate contained 97 % of very light-colored polymer having intrinsic viscosity 5.77 (in cresol), which corresponds to an average degree of polymerization 1068. If the same experiment was repeated with the same amount of N,N'-di-(2,2,4-trimethyl-3-oxovaleroyl)-hexamethylendiamine, which is a known co-catalyst of the 3-oxoamide type, the average degree of polymerization attained but 731.

EXAMPLE 14

A caprolactam batch, containing 0.3 mol % of sodium hydride and 0.3 mol % of dihydro-2-isopropylidene-3-phenyl-5,5-dimethyl-1,3-thiazine-4,6-dione, was polymerized at 175°C according to Example 1. The yield of the polyamide amounted to 95.6 %. Similar results were obtained if the above co-catalyst was replaced by the same amount of dihydro-2-isopropylidene-3-ethyl-5,5-dibenzyl-1,3-thiazine-4,6-dione or dihydro-2-isopropylidene-3,5,5-triethyl-1,3-thiazine-4,6-dione.

EXAMPLE 15

1 mol % of sodium hydride and 1 mol % of dihydro-2-isopropylidene-3-ethyl-5,5-dimethyl-1,3-oxazine-4,6-dione were dissolved at 80°C in 8.5 g of pyrrolidone. At 30°C about 25 % of polypyrrolidone was formed during 24 hours, whereas without the co-catalyst the polymerization practically did not take place.

EXAMPLE 16

0.3 mol % of sodium hydride and 0.3 mol % of the co-catalyst according to the Example 15 were dissolved in molten laurolactam. After 120 minutes at 160°C the polymerizate contained almost the equilibrium amount of the polyamide. Similar result was obtained with caprylolactam.

EXAMPLE 17

0.3 mol % of the adduct of pyrrolidone with α,α-dimethyl malonyl chloride (prepared according to J.Org. Chem. 31, 2996, 1966) was added to molten caprolactam, containing 0.5 mol % of its sodium salt. After one hour at 170°C a yield of 96 % of polycapronamide was attained.

EXAMPLE 18

0.3 mol % of the co-catalyst mentioned in Example 1 was dissolved in a 5 % solution of 3,4-trimethylene-2-azetidinone in anhydrous dimethylsulfoxide. 0.3 mol % of butyl lithium in heptane solution was added and the solution kept at 30°C for 30 minutes. The polyamide was precipitated with ether in a yield of almost 100 %.

EXAMPLE 19

The experiment described in Example 13 was repeated, using 0.324 mol % of the sodium salt and 0.332 mol % of the same co-catalyst. The batch was heated 5 minutes to 210°C and 25 minutes to 175°C. Then the polymerizate contained 95.6 % of an almost white polyamide, degree of polymerization 872.

EXAMPLE 20

Polymerization mixture containing 0.29 mol % of sodium and 0.304 mol % of the co-catalyst mentioned in Example 13 was polymerized at 152°C. Within 16 to 17 minutes the solution solidified and after 60 minutes at the same temperature contained 97.5 % of a highly white polycapronamide having the intrinsic viscosity 6.03.

EXAMPLE 21

A solution containing 0.305 mol % sodium and 0.9 mol % of the co-catalyst as in Example 13 in caprolactam was kept at 210°C for 30 minutes. Thereafter the polymerizate contained 91 % of polycapronamide, intrinsic viscosity 2.14.

EXAMPLE 22

Analogical results as in Examples 13, 19, 20 and 21 were obtained if the co-catalyst was replaced by the same amount of 1-phenyl- or 1-(p-methoxy)- or also 1-(p-toluyl)-3,3,5,5-tetramethyl piperidinetrione.

EXAMPLE 23

A mixture of 15 % of gamma-methyl caprolactam and 75 % of caprolactam was polymerized at 175°C in the presence of 0.3 mol % of sodium and 0.3 mol % of 1-dodecyl-3,3,5,5-tetramethyl-2,4,6-piperidinetrione and 0.1 mol % of 1,3,5,5-tetramethyl-2,4,6-piperidinetrione. After 60 minutes the polymerizate contained almost equilibrium amount of the copolyamide.

EXAMPLE 24

In a melt, containing 75 % of caprolactam and 25 % of laurolactam there was gradually dissolved 0.29 mol % of sodium hydride and 0.3 mol % of 1-octadecyl-3,3,5,5-tetramethyl-2,4,6-piperidinetrione and 0.1 mol % of 1-phenyl-3,3-dimethyl-2,4,6-piperidinetrione. After 60 minutes keeping at 160°C a very light-colored polymerizate was obtained, containing almost theoretical equilibrium amount of the polymer.

EXAMPLE 25

0.3 mol % of sodium salt of caprolactam and 0.3 mol % of the co-catalyst of the Example 13 were dissolved in molten caprolactam. The mixture was heated to 160° – 163°C for 120 minutes. The polymerizate contained almost theoretical equilibrium amount of the polyamide. Similar result was obtained with laurolactam, using the same amount of 1,3,5,5-tetramethyl-2,4,6-piperidine-trione at equal conditions of polymerization.

EXAMPLE 26

1 mol % of sodium salt of pyrrolidone, prepared from pyrrolidone and sodium hydride, and 1 mol % of 1,3-diethyl-5,5-dimethyl-2,4,6-piperidine-trione were dissolved at 80°C in pyrrolidone. After 24 hours at 30°C about 15 % of polypyrrolidone was obtained, while without co-catalyst the polymerization practically did not take place (the conversion was lower than 1 %).

EXAMPLE 27

0.5 mol % of 1,3,3,5,5-pentamethyl-2,4,6-piperidine-trione and 0.5 mol % of butyl lithium were dissolved in a 5 % solution of trimethylenepropiolactam in anhydrous dimethyl sulfoxide. After 30 minutes at 30°C the polymer was precipitated with ether and isolated in an almost theoretical yield.

What is claimed:

1. The method of preparing solid polyamides by anionic polymerization of cyclic lactams containing at least 4 atoms in a ring which comprises polymerizing at least one such lactam in the presence of a cocatalyst having the formula

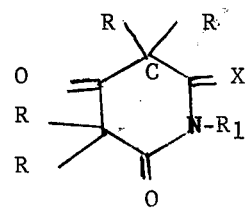

wherein R is $C_{1-18}$ alkyl, $C_{1-18}$ alkenyl, or arloweralkyl, $R_1$ is R, alryl or diloweralkylaminoaryl, lower alkoxyaryl and X is oxygen or sulfur.

2. The method according to claim 1 wherein X is oxygen.

3. The method according to claim 1 wherein X is sulfur.

4. The method according to claim 1 wherein the cocatalyst is 1-octadecyl-3,3,5,5-tetramethyl-2,4,6-piperidinetrione.

5. The method according to claim 1 wherein the cocatalyst is 1-phenyl-3,35,5-tetramethyl-2,4,6-piperidinetrione.

* * * * *